Sept. 21, 1965 B. PASTY 3,208,015

WAVE GUIDING STRUCTURE

Filed May 10, 1960 3 Sheets-Sheet 1

INVENTOR
B. PASTY
BY Craig and Freudenberg
ATTORNEYS

Sept. 21, 1965 B. PASTY 3,208,015

WAVE GUIDING STRUCTURE

Filed May 10, 1960 3 Sheets-Sheet 2

INVENTOR
B. PASTY
BY Craig and Freudenberg
ATTORNEYS

Sept. 21, 1965 B. PASTY 3,208,015

WAVE GUIDING STRUCTURE

Filed May 10, 1960 3 Sheets-Sheet 3

INVENTOR
B. PASTY
BY Craig and Freudenberg
ATTORNEYS

United States Patent Office 3,208,015

Patented Sept. 21, 1965

3,208,015
WAVE GUIDING STRUCTURE

Bernard Pasty, Paris, France, assignor to Compagnie Generale de Telegraphie Sans Fil, Paris, France Filed May 10, 1960, Ser. No. 28,100
Claims priority, application France, May 27, 1959, 795,734
8 Claims. (Cl. 333—31)

Figures 1, 2:
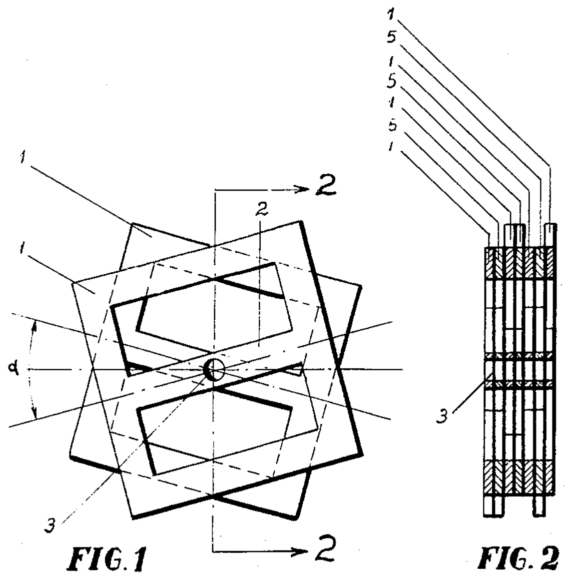

The present invention relates to delay line structures for traveling wave tubes, and more particularly to ladder-type delay lines.

The present invention aims at improvements in these lines, having as its purpose to impart thereto a negative dispersion characteristic of the fundamental space harmonic or space wave and to permit the construction thereof in such a manner that the delay lines may be practically realized in very small dimensions, necessary when the delay line has to be used in a tube operating in the millimeter wave band.

It is known that an ordinary conventional ladder-type delay line, that is a delay line composed of a series of parallel bars disposed in a plane and connected by longitudinal supports, possesses such a large dispersion characteristic that it practically does not propagate at all so that it becomes necessary to dispose within the proximity thereof a conducting surface usually called back-plate in order that it may generally propagate. This large dispersion is due to the reciprocal compensation of the electric and magnetic couplings between consecutive cells of the delay line, which couplings are respectively opposed.

It is also known that in order to impart to such line a negative dispersion characteristic of the fundamental space wave or space harmonic, it is appropriate to reduce the absolute value of the magnetic coupling relative to the electric coupling, and different means are known in the prior art for that purpose, for example, as described in the French Patent 1,068,673 of June 28, 1952, assigned to the assignee of the present application. Nevertheless, when it is desired to apply these prior art techniques to millimetricwave tubes, the smallness of the elements of the delay line and minuteness of the dimensions thereof renders the application thereof prohibitive, and, in particular, it becomes impossible to realize thereby a delay line which is both sturdy and non-deformable.

The present invention aims in particular at delay lines of the latter type applicable to tubes operating in the millimeter wave band which operate with a fundamental backward wave or space harmonic and with a beam of negligible transverse dimension as compared to the wave length used.

The delay line according to the present invention, provided for this application, is characterized by the fact that the bars of the ladder, each provided in the center thereof with an aperture of negligible dimensions with respect to the wave length utilized, and oriented to permit the passage therethrough of the electron beam in the longitudinal direction of the line, are divided into two ladders having alternately imbricated bars, the planes of the two ladders crossing each other at a certain angle along the axis of alignment of the apertures within the bars.

According to another feature of the present invention, the bars possess, within the transverse dimension thereof normal to the axis of intersection of the planes of the two ladders, a smaller dimension toward the centers of the bars than toward the ends thereof, the variation taking place, for example, progressively.

According to still another feature of the present invention, the line is realized by a process of lamination, consisting in establishing the elements of the line in the form of washers, suitably cut which thereupon are stacked and brazed together. By choosing at the time of assembly and prior to brazing the angular displacement of the washers containing the respective bars of the two ladders, it is possible to obtain with the elements of the same type a delay line having a dispersion characteristic chosen at will between two given limits.

Accordingly, it is an object of the present invention to provide a wave guiding structure suitable for millimetric wave operation which obviates the disadvantages encountered in the prior art structures and which may be readily constructed to possess the desired dispersion characteristics.

Still another object of the present invention is the provision of a delay line structure for use at millimeter wave lengths of which the dispersion characteristic may be obtained in a simple and reliable manner without great expenditures and without difficulties in the manufacture and assembly operations.

A further object of the present invention is the provision of a wave guiding structure for use in traveling wave tubes in which the dispersion characteristics may be chosen at random to suit the particular needs whereby the chosen dispersion characteristic may be readily obtained without changes in the overall dimensions of the geometrically periodic elements of the delay line.

Figure 3:
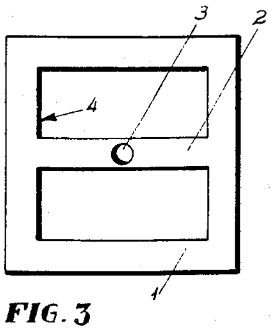
Figure 4:
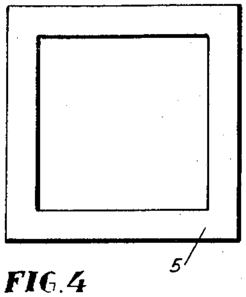
Figure 5:
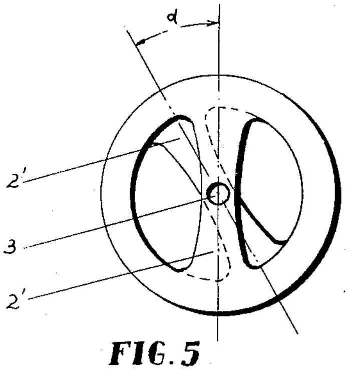
Figure 6:
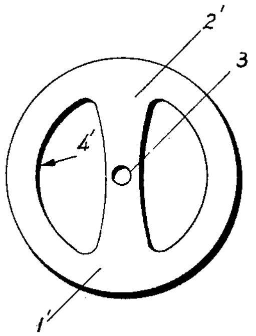
Figure 7:
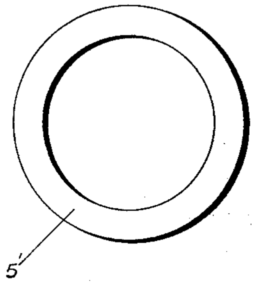
Figure 11:
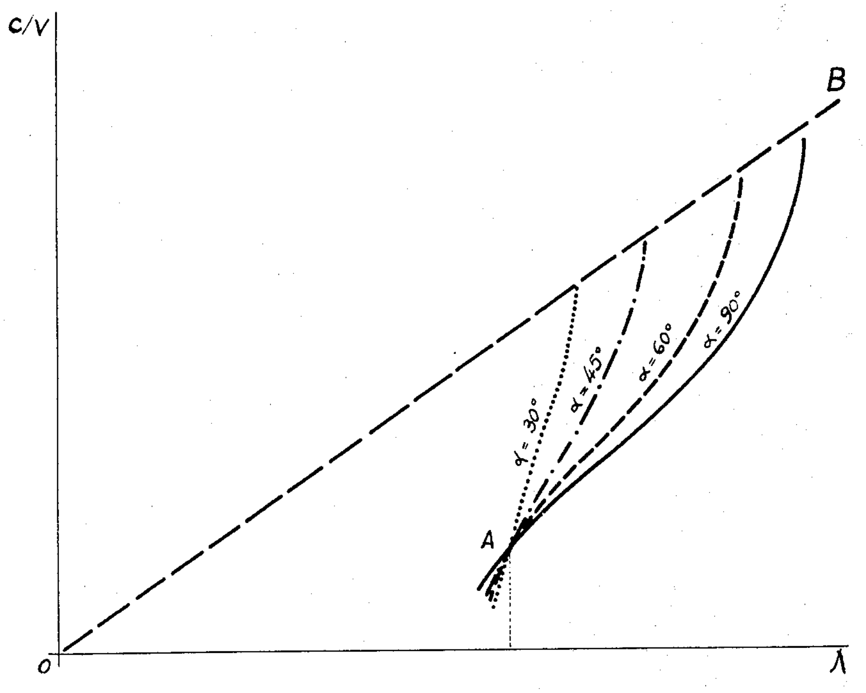
Figure 8:
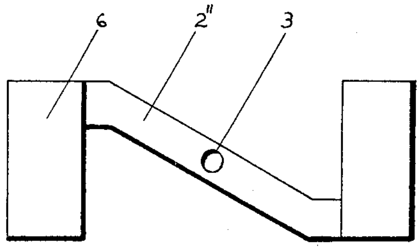
Figure 9:
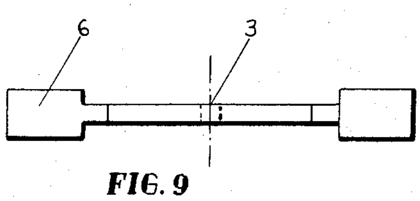
Figure 10:
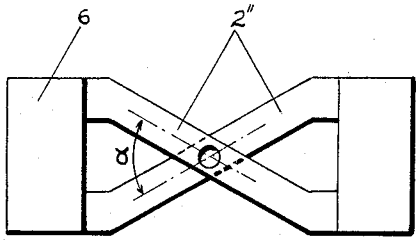

These and other objects, features and advantages of the present invention will become more obvious from the following description when taken in connection with the accompanying drawing which shows, for purposes of illustration only, several embodiments in accordance with the present invention and wherein:

FIGURE 1 is an end view of a first embodiment of a delay line structure in accordance with the present invention, FIGURE 2 is a cross-sectional view taken along line 2—2 of FIGURE 1, FIGURES 3 and 4 are end views of individual delay line elements of the delay line of FIGURES 1 and 2, FIGURE 5 is an end view of a second embodiment of a delay line in accordance with the present invention, FIGURES 6 and 7 are end views of the individual delay line elements used in connection with the delay line of FIGURE 5, FIGURE 8 is an end elevational view of a third embodiment of a delay line element in accordance with the present invention, FIGURE 9 is a top plan view of the delay line element of FIGURE 8, FIGURE 10 is a front elevational view of a delay line composed of elements shown in FIGURES 8 and 9, and FIGURE 11 is a diagram showing a family of dispersion curves for the lines in accordance with the present invention.

Referring now to the drawings wherein like reference numerals are used throughout the various views to designate corresponding parts, and more particularly to FIGURES 1 and 2 thereof showing in end view and cross-sectional view a first embodiment of the delay line in accordance with the present invention, the delay line illustrated therein is realized by an alternately stacking of two types of metallic washers, obtained, for example, by cutting or stamping the same in conformity with the elements illustrated in FIGURES 3 and 4.

The washer 1 of FIGURE 3 comprises a bar 2 provided in the center thereof with an aperture 3 and having the ends thereof secured to a back plate 4, for example, of rectangular configuration. The washer 5 of FIGURE 4 is a simple frame of rectangular configuration. The washers 1 in the assembly are themselves alternately displaced by an angle $\alpha$ as shown in FIGURE 1. After stacking the delay line elements formed by two alternating types of washers with a predetermined appropriate choice of the angle $\alpha$ therebetween, the respective washers are united into a rigid assembly in any suitable manner, for example, by brazing. The apertures 3 are aligned thereby and form a channel intended to permit the passage therethrough of the electron beam.

Both theory and practical experience have clearly demonstrated that the propagation of the high-frequency electromagnetic wave within such line takes place with a negative dispersion of the fundamental space harmonic or space wave. This feature may be explained from the fact that the magnetic coupling between successive cells of the delay line is reduced relative to the electric coupling thereof, thanks to the relative spacing or distance between the extremities of the bars 2 of successive washers 1, in comparison with the homologue ends of the adjacent bars of a conventional ladder-type delay line. The negative dispersion obtained within a given band of wave lengths is the smaller in absolute value to the extent that the aforementioned spacing or distance between extremities of the bars 2 increases, that is, as the angle $\alpha$ increases. This permits, by a suitable choice of the angle $\alpha$, the obtainment of a dispersion of any value comprised between the limits fixed by the cases of $\alpha=0$ and $\alpha=90°$.

FIGURE 5 illustrates a view analogous to that of FIGURE 2 of a second embodiment of a delay line composed of two types of washers, illustrated respectively in FIGURES 6 and 7. In this embodiment, shown herein only with the single purpose of illustrating the possibilities of different modifications, a back plate 4' of circular configuration and washers 1' and 5' also of circular shape have been illustrated, however, in view of the complete analogy with the preceding figures the same primed reference numerals have been retained to designate analogous elements. The washers of FIGURES 6 and 7 are assembled as in connection with the delay line of FIGURES 1 and 2. The essential difference of the embodiment of FIGURES 5 through 7 is the fact that the bars 2' are enlarged toward the outer extremities thereof in their dimension located within the plane of the washers, the enlargement being, for example, progressive but may also be realized in gradients or steps. In this manner, the sturdiness and rigidity of the bars and of the line as a whole is increased. Even though this enlargement increases the magnetic coupling between neighboring cells and thereby acts in a contrary sense to the diminution of the coupling obtained due to the relative spacing or separation of the extremities of the bars, it has been demonstrated in tests that the effect of diminution remains nevertheless preponderant in such a line so that a negative dispersion is always obtained though variable with variations in the angle $\alpha$ within limits less far apart than in the case of bars of uniform dimension.

FIGURE 8 illustrates a third embodiment of a delay line element, in the form of a member cut-out or stamped out in the shape of a Z, that is comprising a bar 2'' forming a single unitary piece with the two lateral end supports 6 thereof, the assembly being symmetrical with respect to the center of the aperture 3 but being asymmetrical with respect to a longitudinal plane of symmetry. As shown in FIGURE 9, the supports 6 in this embodiment are widened or reinforced in relation to the bars 2'' in such a manner that the intermediary pieces, analogous to those of FIGURES 4 and 7 are effectively eliminated. The delay line of FIGURE 10 is constituted by stacking successively the pieces of FIGURE 8, and by inversing alternately the faces thereof. This line, for example, is no longer completely surrounded by a back plate but is simply constituted by two ladders having alternately imbricated bars which are secured between two longitudinal supports 6.

FIGURE 11 illustrates a family of dispersion curves plotted in the diagram along the ordinate of which is indicated the ratio $c/v$, where $c$ is the speed of light and $v$ is the phase velocity of the wave, and along the abscissa of which is indicated the wave lengths $\lambda$. These curves have been plotted for delay lines intended to be utilized in so-called "Carcinotron" or backward wave oscillators having an adjustable tuning within the band of 8 mm.$\pm$15%. The bars 2, 2' or 2'' thereby have an effective length equal to 3.5 mm. and the apertures 3 a diameter equal to 0.5 mm. Four delay lines have been built with respective angles of $\alpha$ corresponding to 30°, 45°, 60° and 90°. It is noted that the curves all intersect at a point A which corresponds to a wave length approximately equal to twice the wave length of the bars. To the left of the point A, the curves are approximately coincident, and the influence of the angle $\alpha$ is only little perceptible. However, to the right of the point A in the diagram of FIGURE 11, that is within the significant region of the band of utilization, the different curves are clearly separate from each other, and it may be readily seen that the dispersion is the smaller in absolute value the larger the angle $\alpha$. At the same time, the band width which is limited by the intersection of each of the curves with the straight line OB representing the locus of the $\pi$ modes, increases with an increase in the angle $\alpha$. Additionally, each particular curve presents the property, which becomes more and more pronounced with an increase in the angle $\alpha$, to bend back toward the top as $\lambda$ increases, that is, to have a dispersion increasing in absolute value with the wave length. This property favors the start of the oscillations as the voltages applied to the line of the tube become lower.

The present invention is not limited to the embodiments described herein but is susceptible of numerous modifications within the scope of a person skilled in the art. Thus, for example, the present invention is not limited to the delay lines realized by the method of lamination described but encompasses generally all delay lines presenting the form of two mutually imbricated ladders and of which the respective planes are displaced at a certain angle whatever the method of manufacture and assembly. The circular aperture 3 for the passage of the electron beam could also be replaced by an aperture of any desired form having negligible dimensions with respect to the wave length, or even by a slot or gap separating completely the bars into two halves with a view to avoid the thermal deformations in accordance with the teachings disclosed in the French Patent 1,086,890 of July 18, 1953, assigned to the assignee of the present application. The shapes of the supports or back plates and of the bars themselves may obtain different modifications within the scope of a person skilled in the art without departing thereby from the spirit of the present invention.

Even though the present invention is applicable most advantageously to millimetric waves, it encompasses also delay lines realized in accordance with the same principles for longer wave lengths if a particular reason or interest exists to utilize the same for such purpose. Additionally, the application of the delay lines in accordance with the present invention is not limited to backward wave oscillators but extends also to backward wave amplifiers and forward wave amplifiers operating by interaction with a direct space harmonic, or to particle accelerators of the traveling wave-type, and generally to any electronic device utilizing a delay structure which is geometrically periodic.

Thus, it is quite obvious that the present invention is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A delay line structure comprising a number of metallic frames disposed substantially about a common axis, metallic bars integral with one out of two frames and located essentially in the middle region thereof, each bar having a small hole essentially in the center thereof and all of said holes being aligned along said axis, said bars extending alternately in two directions at an angle between 30° to 90° to one another so as to form two imbricated ladders in two different planes which intersect substantially in said axis, the dispersion characteristic of said line being varied by varying said angle.

2. A delay line structure as claimed in claim 1, wherein all of said frames are brazed together.

3. A delay line structure as claimed in claim 1, wherein said frames have a square form.

4. A delay line structure as claimed in claim 1, wherein said frames have a circular form.

5. A relay line structure as claimed in claim 4, wherein said bars are wider at the extremities than in the central portion thereof.

6. A delay line structure comprising a number of essentially identical Z-shaped elements, each element including two terminal plates and one cross-bar connecting said plates, each cross-bar having a small hole essentically in the center thereof, said elements being disposed in such a manner that said holes are aligned along a common axis while said cross-bars extend alternately in two directions at an angle to one another thereby forming two imbricated ladders in two different planes which intersect essentially in said axis, the dispersion characteristic of said line being varied by varying said angle.

7. A delay line structure comprising a number of essentially identical, approximately Z-shaped elements, each element including two terminal plates and one cross-bar connected to said plates, the plates being thicker than the cross-bars, each cross-bar having a small hole in the center thereof, said element being disposed in such a manner that said holes are aligned along a common axis while said cross-bars extend alternately in two directions at an angle to one another and said terminal plates being connected correspondingly thereby forming two imbricated ladders in two different planes which intersect essentially in said axis, the dispersion characteristic of said line being varied by varying said angle.

8. A delay line structure comprising a number of metallic frames disposed substantially about a common axis, metallic bars integral with at least one out of two frames and located essentially in the middle region thereof, each bar having a small hole essentially in the center thereof and all of said holes being aligned along said axis, said bars extending alternately in two directions at an angle between 30° to 90° to one another so as to form two imbricated ladders in two different planes which intersect substantially in said axis, the dispersion characteristic of said line being varied by varying said angle.

References Cited by the Examiner

UNITED STATES PATENTS

| | | | |
|---|---|---|---|
| 634,210 | 10/99 | Gillette | 144—237 |
| 2,806,973 | 9/57 | McEwan et al. | 333—31 X |
| 2,872,650 | 2/59 | Winkler | 333—31 X |
| 2,920,227 | 1/60 | Dohler et al. | 315—3.5 |
| 2,922,918 | 1/60 | Wasserman | 315—3.5 |
| 2,926,280 | 2/60 | Hergenrother | 333—31 |
| 2,954,050 | 9/60 | Mourier | 333—31 X |
| 3,010,047 | 11/61 | Bates | 315—3.5 |
| 3,011,085 | 11/61 | Caldwell | 315—3.5 |
| 3,099,767 | 7/63 | Gross | 315—3.6 |

HERMAN KARL SAALBACH, *Primary Examiner.*

BENNETT G. MILLER, *Examiner.*